United States Patent
Ives et al.

(10) Patent No.: US 10,740,005 B1
(45) Date of Patent: Aug. 11, 2020

(54) DISTRIBUTED FILE SYSTEM DEPLOYMENT ON A DATA STORAGE SYSTEM

(71) Applicant: EMC IP Holding Company LLC, Hopkinton, MA (US)

(72) Inventors: Stephen Richard Ives, West Boylston, MA (US); Hongliang Tang, Shrewsbury, MA (US); Kevin Rodgers, Derry, NH (US); Sethu N. Madhavan, Marlborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/868,693

(22) Filed: Sep. 29, 2015

(51) Int. Cl.
*G06F 3/06* (2006.01)
*G06F 16/182* (2019.01)

(52) U.S. Cl.
CPC ............ *G06F 3/0619* (2013.01); *G06F 3/067* (2013.01); *G06F 3/0665* (2013.01); *G06F 3/0689* (2013.01); *G06F 16/1827* (2019.01)

(58) Field of Classification Search
CPC ......... G06F 17/30371; G06F 17/30203; G06F 17/30008; G06F 17/30194; G06F 3/0619; G06F 17/30283; G06F 3/0659; G06F 3/065; G06F 17/302; G06F 17/30292; G06F 3/0665; G06F 3/067; G06F 3/0689
USPC .......... 711/114, E12.103, E12.025, 141, 162
See application file for complete search history.

(56) References Cited

U.S. PATENT DOCUMENTS

| | | | | |
|---|---|---|---|---|
| 6,058,400 | A * | 5/2000 | Slaughter | G06F 16/10 |
| 7,734,820 | B1 * | 6/2010 | Ranade | G06F 16/10 |
| | | | | 709/246 |
| 8,930,568 | B1 | 1/2015 | Chalmer et al. | |
| 2009/0089537 | A1 * | 4/2009 | Vick | G06F 12/0284 |
| | | | | 711/203 |
| 2012/0278293 | A1 * | 11/2012 | Bulkowski | G06F 16/27 |
| | | | | 707/703 |
| 2014/0032849 | A1 * | 1/2014 | De Vleeschauwer | |
| | | | | G06F 12/0862 |
| | | | | 711/133 |
| 2014/0075565 | A1 * | 3/2014 | Srinivasan | H04L 63/10 |
| | | | | 726/26 |

(Continued)

OTHER PUBLICATIONS

Apache Hadoop, URL: https://en.wikipedia.org/wiki/Apache_Hadoop, 11 pages, Dec. 10, 2011.

*Primary Examiner* — Sanjiv Shah
*Assistant Examiner* — Edward Waddy, Jr.
(74) *Attorney, Agent, or Firm* — Muirhead and Saturnelli, LLC

(57) ABSTRACT

Described are techniques for processing requests at a data storage system. A request is received from a client to perform an operation with respect to a first data portion stored on physical storage devices of the data storage system. The first data portion is exposed through a set of at least two data nodes each accessing a same copy of the first data portion stored on the physical storage devices. The request is received at a first of the data nodes of the set. The request is processed with respect to the first data portion using the same copy accessible to each of data nodes of the set. The physical storage devices may be configured in a RAID group and the data nodes, optionally along with a name node providing metadata, may be embedded in the data storage system and execute in a virtualized environment.

20 Claims, 9 Drawing Sheets

(56) References Cited

U.S. PATENT DOCUMENTS

| | | | | |
|---|---|---|---|---|
| 2014/0108648 A1* | 4/2014 | Nelke | ................. | H04L 41/5051 |
| | | | | 709/224 |
| 2014/0149356 A1* | 5/2014 | Agarwal | ........... | G06F 17/30008 |
| | | | | 707/652 |
| 2015/0106578 A1* | 4/2015 | Warfield | ............... | G06F 3/0613 |
| | | | | 711/158 |
| 2016/0036924 A1* | 2/2016 | Koppolu | ................. | H04L 67/16 |
| | | | | 709/224 |
| 2016/0105343 A1* | 4/2016 | Janarthanan | ........ | H04L 43/0876 |
| | | | | 370/252 |
| 2016/0234297 A1* | 8/2016 | Ambach | ............. | H04L 67/1008 |
| 2016/0306822 A1* | 10/2016 | Waghulde | ............ | G06F 16/184 |
| 2016/0323379 A1* | 11/2016 | Kidambi | ................. | H04L 67/34 |

\* cited by examiner

DISTRIBUTED FILE SYSTEM DEPLOYMENT ON A DATA STORAGE SYSTEM

BACKGROUND

Technical Field

This application generally relates to data storage and file systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

SUMMARY OF THE INVENTION

In accordance with one aspect of the invention is a data storage system comprising: one or more physical storage devices; a plurality of data nodes exposing a plurality of portions of a plurality of data entities, wherein a first of the plurality of data portions is exposed through a set of at least two of the plurality of data nodes each accessing a same copy of the first data portion stored on the one or more physical storage devices; and a memory comprising code stored thereon that, when executed, performs a method comprising: receiving a request from a client at a first of the set of at least two data nodes to perform an operation with respect to the first data portion; and processing the request with respect to the first data portion using the same copy accessible to each of data nodes of the set. The one or more physical storage devices may include a plurality of physical storage devices configured in a RAID group providing data protection for the plurality of data portions stored therein. The method may further include issuing a request from the client to a name node requesting metadata regarding the first data portion; and receiving from the name node at the client the requested metadata including first information identifying the set of at least two data nodes. The first information may list the data nodes of the set in order of network proximity with respect to the client. The first data node may be identified as a closest of all data nodes in the set to the client in terms of network proximity to the client. The data entities may be objects included in an object-based system. The data entities may be files included in a file system. The plurality of data nodes may be embedded in the data storage system and may execute in a virtualized environment in the context of virtual machines on processors of the data storage system. Each of the plurality of data nodes may include a coherency layer that performs processing to synchronize and coordinate access to the plurality of data portions between the plurality of data nodes. The coherency layer may be a distributed file system. The coherency layer may be a parallel distributed file system. The name node server may be embedded in the data storage system and may execute in a virtualized environment in the context of a virtual machine on a processor of the data storage system. Each of the plurality of data nodes may communicate with a virtualized port on the data storage system using a cut through driver. The cut through driver may perform memory to memory copying of data between the data node and the virtualized port.

In accordance with another aspect of the invention is a method for processing requests comprising: receiving, at a data storage system from a client, a request to perform an operation with respect to a first of a plurality of data portions stored on one or more physical storage devices of the data storage system, the plurality of data nodes being included in the data storage system and exposing the plurality of data portions of a plurality of data entities, the first data portion being exposed through a set of at least two of the plurality of data nodes each accessing a same copy of the first data portion stored on the one or more physical storage devices, said request being received at a first of the data nodes of the set; and processing the request with respect to the first data portion using the same copy accessible to each of data nodes of the set. The one or more physical storage devices may include a plurality of physical storage devices configured in a RAID group providing data protection for the plurality of data portions stored therein. The method may include issuing a request from the client to a name node requesting metadata regarding the first data portion; and receiving from the name node at the client the requested metadata including first information identifying the set of at least two data nodes. The first information may list the data nodes of the set in order of network proximity with respect to the client. The data entities may be objects included in an object-based system and the plurality of data nodes may be embedded in the data storage system and may execute in a virtualized environment in the context of virtual machines on processors of the data storage system.

In accordance with another aspect of the invention is a computer readable medium comprising code stored thereon, that when executed, performs a method for processing requests comprising: receiving, at a data storage system from a client, a request to perform an operation with respect to a first of a plurality of data portions stored on one or more physical storage devices of the data storage system, the plurality of data nodes being included in the data storage system and exposing the plurality of data portions of a plurality of data entities, the first data portion being exposed through a set of at least two of the plurality of data nodes each accessing a same copy of the first data portion stored on the one or more physical storage devices, said request being received at a first of the data nodes of the set; and processing the request with respect to the first data portion using the same copy accessible to each of data nodes of the set.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
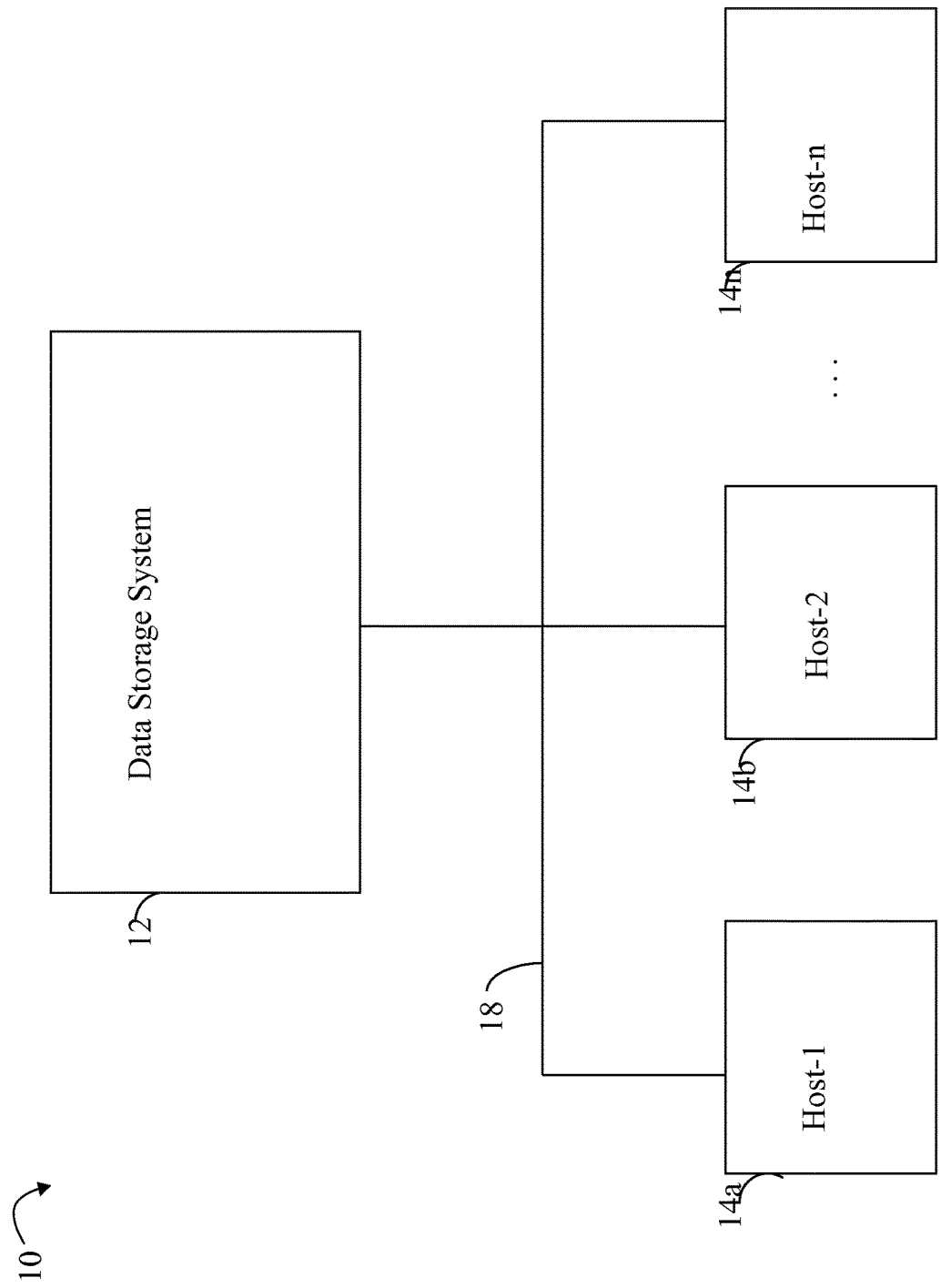
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and also various file system protocols (e.g., NFS, pNFS) and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
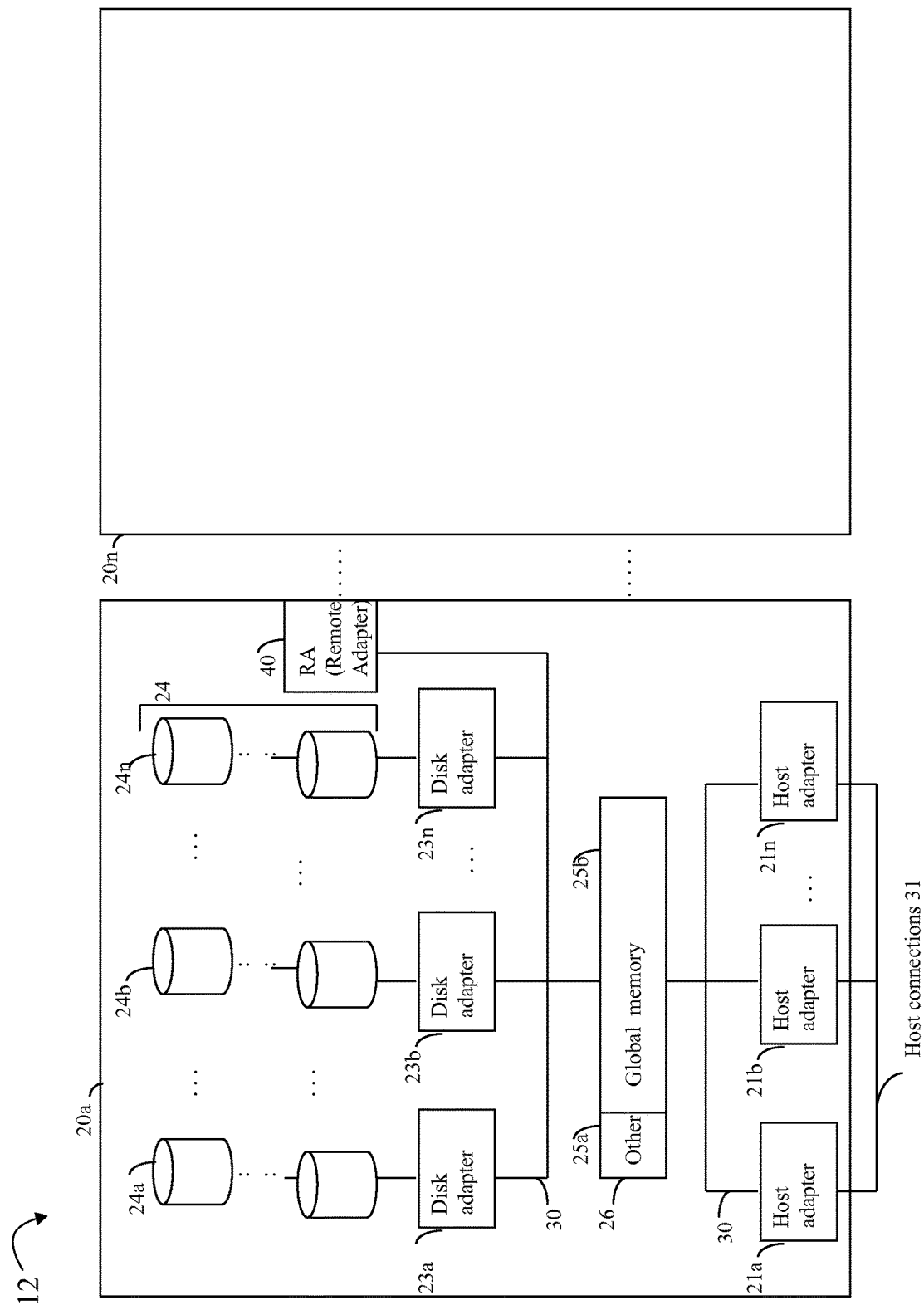
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n. In this arrangement, each of the n groupings of disks may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk controller. The DA may performed operations such as reading data from, and writing data to, the physical devices (e.g., physical storage devices also referred to as PDs) which are serviced by the DA.

It should be noted that the data storage devices 24a-24n may be generally any suitable back-end physical storage device such as, for example, a rotating disk drive, a flash-based drive or more generally any form of solid state drive (SSD) (e.g., drive that is not a rotating disk drive), and the like.

An embodiment may have one or more defined storage tiers with respect to data storage provided by one or more data storage systems. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as a rotating SAS, or NL-SAS disk drive, and the like. Data protection may specify a type or level of data storage protection such, for example, as a particular RAID (Redundant Array of Independent Disks) level (e.g., RAID1 providing data mirroring, RAID-5 3+1, RAID-5 7+1, and the like). Performance characteristics may relate to different performance aspects of the physical storage devices of a particular type or technology. For example, there may be multiple types of rotating disk drives based on the RPM characteristics of the disk drives (e.g., 10K RPM drives and 15K RPM drives) and disk drives having different RPM characteristics may be included in different storage tiers. Storage capacity may specify the amount of data, such as in bytes, that may be stored on the drives. To further illustrate, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all 15K RPM disk drives, and a third tier of all 7.2K RPM disk drives. The foregoing are some examples of tier definitions and, of course, other tier definitions may be specified.

Also shown in the storage system 20a is an RA or remote adapter 40. The RA may be hardware including a processor used to facilitate communication between data storage systems, such as between two of the same or different types of data storage systems.

The system 20a may also include one or more front end adapters or host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
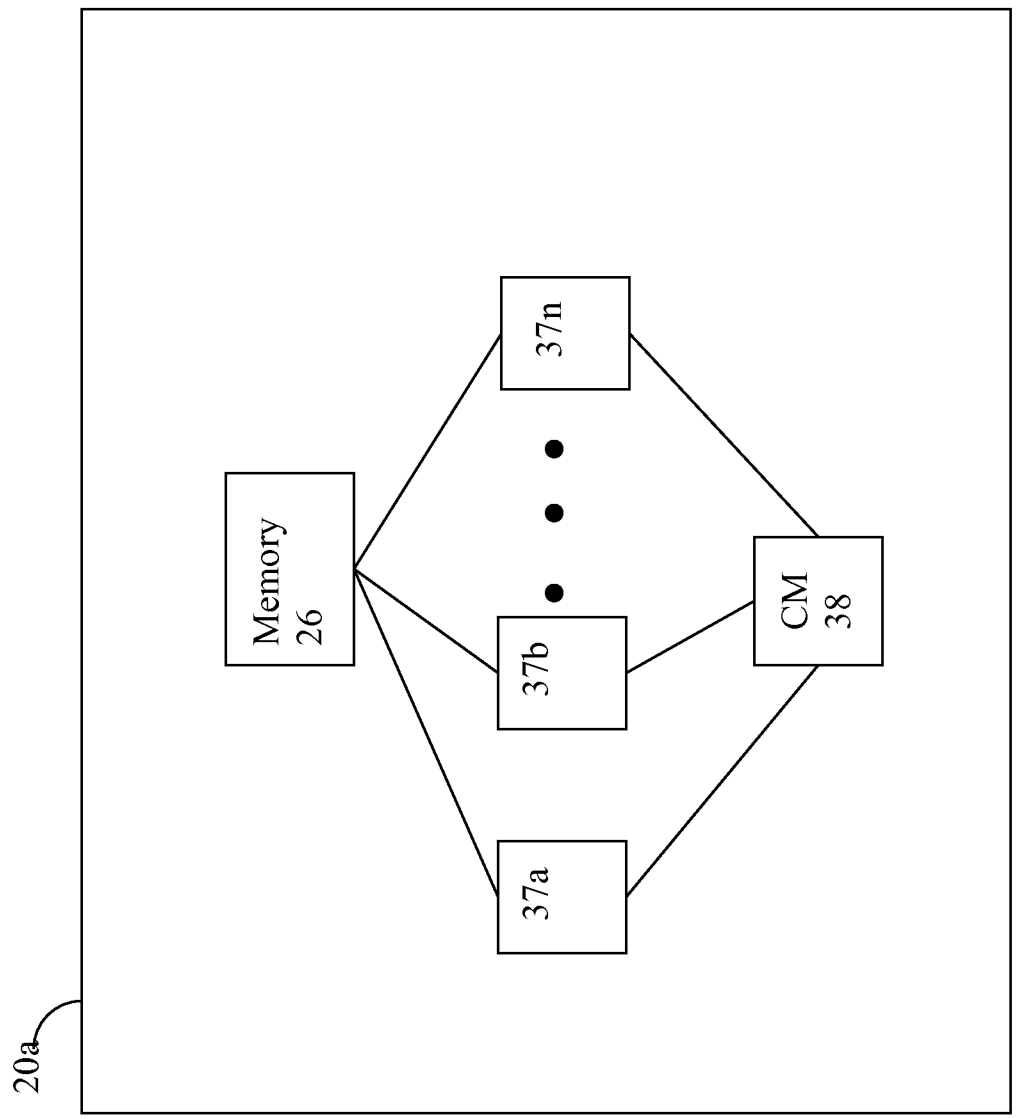
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In some embodiments, the data storage system may be an intelligent data storage system having its own one or more mapping layers. For example, a LUN known or exposed to the host may not directly correspond to a physical device such as a disk drive. In such embodiments, the LUN identified by the host in connection with the I/O operation may be further mapped by the data storage system using its mapping layer. For example, a LUN provided by the host may be mapped by the data storage system to one or more physical drives, multiple LUNs may be located on a same physical device, multiple physical drives, and the like. In other embodiments, the data storage system may not include such a mapping layer(s).

A host, as a data storage client, may communicate using any suitable protocol. For example, a host may issue reads and/or writes as well as other requests using any of block-based protocols and interfaces, file-based protocols and interfaces, and object-based protocols and interfaces.

Figure 3:
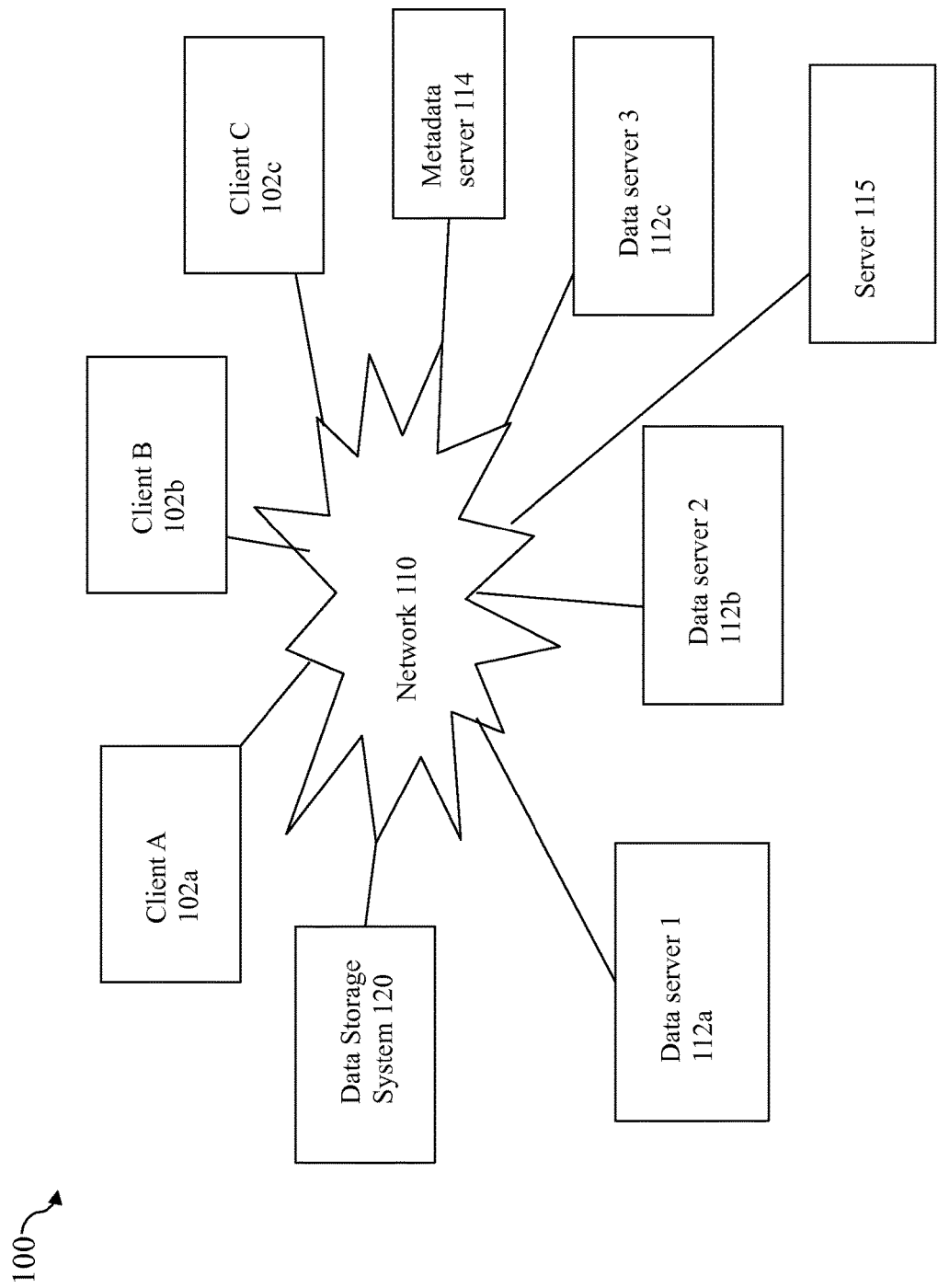
FIGS. 3 and 4 are examples of components of a distributed server and metadata server.

Referring to FIG. 3, shown is an example of a system and network. The example 100 includes client computer systems 102a-c, data storage system 120, network 110, a metadata server 114, and data servers 112a-c. The data storage system 120 may include one or more data storage systems as described elsewhere herein such as in connection with FIGS. 1 and 2. Each of 112a-c, 102a-c, 114, 115 and/or 120 may communicate with each other over network 110. Although a particular number of clients and file servers are illustrated in the example 100, an embodiment may include generally any number of one or more clients and one or more file servers.

Each of the data servers 112a-c may be, for example, a host system (such as described in connection with FIG. 1) or more generally any suitable computer system for use in connection with processing received client requests. The clients 102a-c may be any computer system such as a laptop or desktop computer. As described in more detail below, the file systems and associated services provided by data servers 112a-c may comprise a distributed file system or distributed object system in accordance with techniques herein. The data servers 112a-112c may collectively serve as a front end to the entire distributed object system comprising multiple objects or distributed file system comprising multiple file systems whereby such servers 112a-c provide for parallelism and scalability as will be appreciated by those of ordinary skill in the art. The network 110 may be an IP (internet protocol) network.

The metadata server 114 may be used in connection with providing metadata. In contrast, each of the file servers 112a-c may be used to store and access application data.

The distributed object system may be built on top of a distributed file system (DFS) such as, for example, the Hadoop Distributed File System (HDFS) which is part of the Apache Hadoop open-source software framework for distributed storage and distributed processing of large data sets. Thus, HDFS is one component in the Hadoop framework that may be generally used by clients, such as applications. HDFS, as with other DFSs more generally, stores file system metadata and application or user data separately. Metadata may be stored on a dedicated metadata (MD) server 114, also referred to herein as the name node server. Application or user data may be stored on other servers 113a-c also referred to herein as data nodes. With HDFS as also with other DFSs more generally, all servers 113a-c and 114 are fully connected and may communicated with each other, for example, using TCP-based protocols. With a DFS, data of a single file may be divided into multiple partitions where each partition may be stored on a different one or more of the servers 112a-c whereby the file content is said to be distributed across multiple ones of the servers 112a-c. Thus, a client may communicate with different ones of the servers 112a-c depending on what particular portion of the file content the client wants. In an object-based system using objects rather than files, the metadata as provided by the MD server 114 may be with respect to objects and portions or blocks of objects distributed across the servers 112a-c in a manner similar to the way portions or blocks of files are distributed across servers 112a-c.

Described in following paragraphs is an initial discussion of components and functionality that may be embodied in a distributed file system and in particular the HDFS exposing a distributed object-based system and associated API (application programming interface) for use by clients rather than a distributed file-based system and associated interface. HDFS may implement the distributed object-based system as a layer on top of the distributed file system. In this case, each of the servers 112a-c may be referred to as object servers and the MD server 114 may be referred to as an object MD server. As described below each object may be partitioned into a plurality of data blocks distributed across the servers 112a-c in a manner similar to portions of blocks of a file.

In an embodiment in accordance with techniques herein as described in more detail below, the data nodes may be embedded in the data storage system and may also have their backing physical storage provisioned from one or more data storage systems 120 where a single physical copy of each data block may be exposed through multiple ports and paths to clients. For example, each of the servers 112a-c as data nodes in the HDFS embedded in the data storage system may each store data on one or more the data storage systems 120. However, in traditional existing systems not using techniques herein, the data nodes may have their backing storage provisioned from local storage devices, such as local disk drives, attached to each of the servers 112a-c where there are multiple replicas on the file servers 112a-c. The foregoing is described in more detail below. Prior to describing details of using HDFS in an embodiment in accordance with techniques herein, paragraphs below provide a description regarding DFS and in particular HDFS as may be deployed in systems not using techniques herein.

With HDFS as a particular DFS instance in existing systems, servers as data nodes do not rely on data protection mechanisms on individual file servers 112a-c such as RAID to provide for protection from data loss or data unavailability. Rather, HDFS achieves reliability through data replication across multiple servers or data nodes. Thus, using HDFS, for example a single file or object may be split into 4 portions, such as blocks, where each portion or block may be stored on multiple data nodes. The particular number of copies or replicas of each portion stored on a different data node may be based on a replication factor. For example, HDFS may have a default replication value of 3 denoting that each data portion is stored on 3 data nodes whereby in such an HDFS, there are 3 physical copies or replicas of each data portion. With HDFS, there number of data nodes or servers available to serve content is based on the number of data nodes configured which is based on the number of configured replicas. So, for example, the replication value may be configured as 1 whereby content is not replicated at all across multiple data nodes and the single copy of the content is exposed only through a single data node, such as only one of the servers 112a-c.

The HDFS namespace may be a hierarchy of data entities (e.g., such as files in a file-based system or objects in an object-based system) and directories of such data entities. In either case, data entities, such as objects or files and directories, may be represented on the name node by inodes. Modes record attributes like permissions, modification and access times, namespace and disk space quotas. The content of each data entity, such as an object or file, is split into large blocks (e.g., such as 128 megabytes, but may be user selected file-by-file), and each block thereof may be independently replicated at multiple data nodes (e.g., replication factor such as 3 may be user selected on an object by object or file by file basis). The name node maintains the namespace tree and the mapping of blocks to data nodes indicating which data nodes store which block or portion.

The inodes and the list of blocks that define the metadata of the name system may be referred to as the image. Name node keeps the entire namespace image in memory, such as RAM. The persistent record of the image stored in the name node's local native filesystem is called a checkpoint. The name node records changes to HDFS in a write-ahead log called the journal in its local native filesystem. The location of (e.g., which data nodes contain) block replicas are not part of the persistent checkpoint.

Each client-initiated transaction (e.g., a request to write content) is recorded in the journal, and the journal file is flushed and synced before the acknowledgment is sent to the client. The checkpoint file may not be modified by the name node. Rather, a new file may be written when a checkpoint is created during restart, when requested by the administrator, and the like. During startup the name node initializes the namespace image from the checkpoint, and then replays changes from the journal. A new checkpoint and an empty journal are written back to the storage directories before the name node starts serving clients.

The HDFS file system or object system may also include a secondary name node which may be a separate server 115. The secondary name node may periodically connect with the primary name node 114 and build snapshots of the primary name node's directory information, which the system then saves to local or remote directories. These check pointed images can be used to restart a failed primary name node without having to replay the entire journal of filesystem actions, then to edit the log to create an up-to-date directory structure. The secondary name node may be created as primary name node backup to be used in case the primary name node goes down or is otherwise unavailable to service client requests. All data nodes and the primary secondary name nodes may be included in a logical grouping referred to as a cluster.

Each data node may be a server such as a separate computer system running the LINUX operating system where the block replica may be mapped to local native file system of the data node which may be further mapped to a local block-based representation on the data node. For example, on a data node, each block replica or data portion stored thereon may be represented using 2 files in the local native file system of the data node. The first file contains the data itself and the second file records the block's metadata such as, for example, checksums for the data. During startup each data node connects to the name node and performs a handshake. The purpose of the handshake is to verify the namespace ID and the software version of the data node. If either does not match that of the name node, the data node may automatically shuts down. The namespace ID may be assigned to the filesystem instance when it is formatted. The namespace ID is persistently stored on all nodes of the cluster. Nodes with a different namespace ID will not be able to join the cluster, thus protecting the integrity of the filesystem. A data node that is newly initialized and without any namespace ID is permitted to join the cluster and receive the cluster's namespace ID. After the handshake the data node registers with the name node. Data nodes may persistently store their unique storage IDs. The storage ID is an internal identifier of the data node, which makes it recognizable even if it is restarted with a different IP address or port. The storage ID is assigned to the data node when it registers with the name node for the first time and never changes subsequently.

A data node identifies block replicas in its possession to the name node by sending a block report. A block report includes the block ID (denoting the particular block), the generation stamp and the length for each block replica the server hosts. The first block report is sent immediately after the data node registration. Subsequent block reports may be sent periodically thus providing the name node with an up-to-date view of where block replicas are located on the cluster.

During normal operation, data nodes periodically send heartbeat messages to the name node to confirm that the data node is operating and the block replicas it hosts are available. If the name node does not receive a heartbeat from a data node within a predetermined time period, the name node may consider the data node to be unavailable where the block replicas hosted by the data node are then considered to be unavailable. The name node then schedules creation of new replicas of those blocks on other data nodes. It should be noted that heartbeat messages from a data node may also include other information such as, for example, information about total storage capacity of the data node, fraction of storage of the data node that is used or consumed, and the number of data transfers currently in progress. These statistics may be used, for example, for the name node's block allocation decisions and for load balancing decisions. The name node does not sent requests directly to data nodes. Rather, the name node may reply to a heart beat message to send instructions to a data node. Such instructions may include, for example, commands to replicate blocks to other data nodes, remove local block replicas, re-register, send a block report, shut down the data node, and the like.

HDFS supports operations to create, read, write and delete data entities (e.g., objects in an object-based system and files in a file-based system as exposed to the clients), and operations to create and delete directories (e.g., directories of objects in an object-based system and directories of files as in a file-based system). The user, such as a client, references object or files and directories by paths in the namespace.

Figure 4:
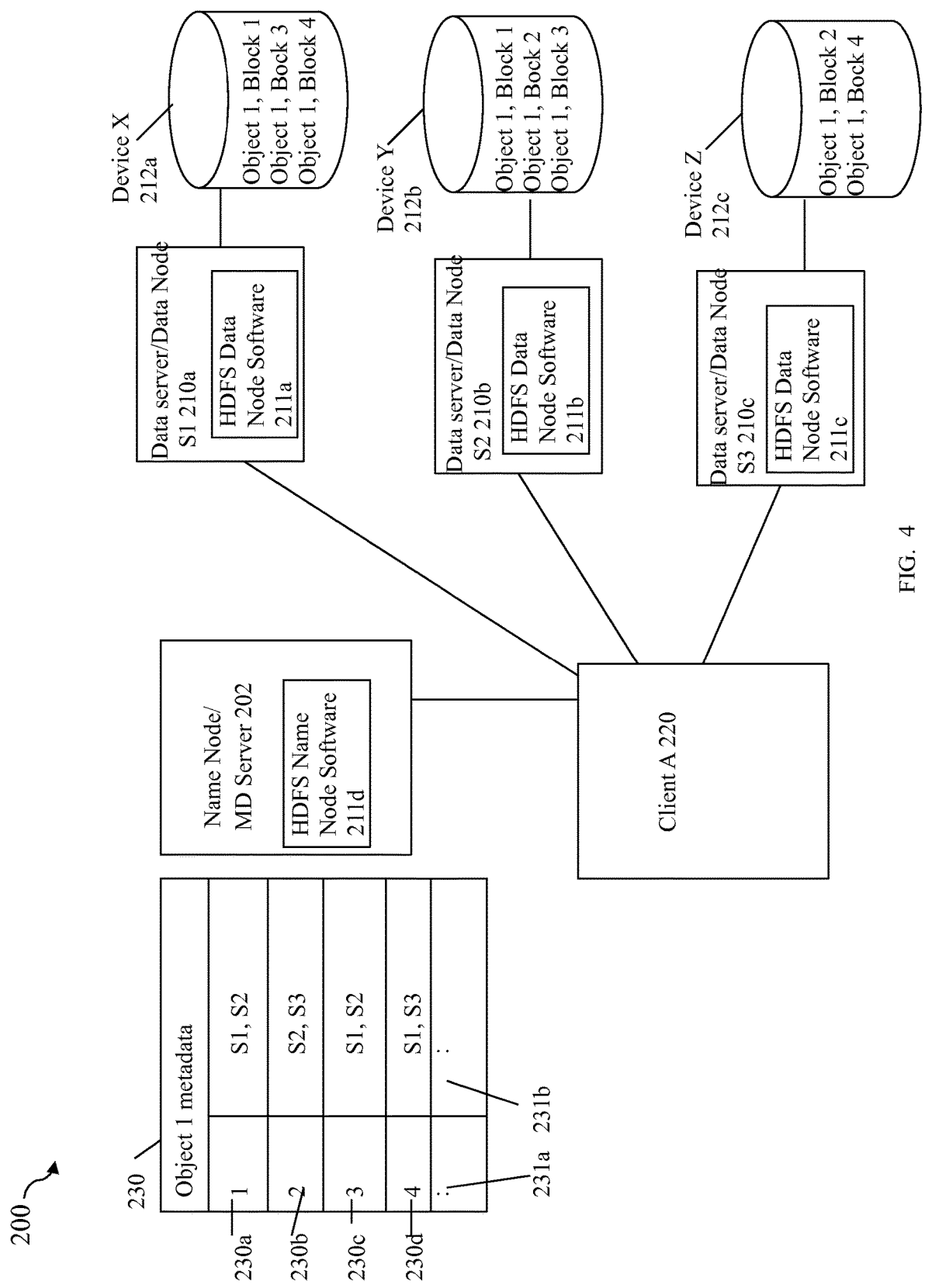

Referring to FIG. 4, shown is an example of a DFS, such as the HDFS and associated data nodes 210a-c and name node 202. Such an embodiment of HDFS may be used to distribute blocks or portions of objects. Each of the data nodes 210a-c may store its block replicas on physical storage attached to the data node, such as on local storage devices 212a-c respectively of the data nodes 210a-c. In this example for HDFS, each of the data nodes 210a-c may respectively include an instance of the HDFS data node software 211a-c thereon, and the name node 202 may include an instance of the HDFS name node software 211d thereon. Although not illustrated for simplicity, the data storage system may also include a secondary name node which may also include an instance of the HDFS secondary name nodes software thereon. It should be noted that 211a-d (as well as the secondary name node software of the HDFS) may include code that performs processing consistent with description herein for the HDFS. For example, each of 211a-c may include code which maps the data block or chunk to a file in the local native file system of the data node and then further maps file to a local block-based representation native to the data node.

With reference to FIG. 4, when an application, such as client A 220 reads an object, such as Object 1, the HDFS client first asks the name node for the list of data nodes that host replicas of the blocks of the object 1. The list is sorted by the network topology distance from the client. For example, as illustrated, the client A 220 may contact the name node 202 for the list 230 denoted as object 1 metadata identifying which data nodes host which blocks of the object. In this example, element 230 includes a first column identifying data blocks and a second column of data nodes hosting each of the data blocks. In this example, it is noted that the replication factor is 2 whereby each data block may be replicated and stored on 2 different data nodes. Each of rows 230a-d respectively denotes the data nodes in column 231b hosting the data blocks 1-4 identified in column 231a. The client 220 may then contact a particular data node directly to request a desired block based on the metadata 230. When reading a data block replicated on multiple data nodes, the client 220 may first contact the closest data node (e.g., closest in terms of network proximity or distance ordering as may be denoted in the returned metadata data 230). If the read attempt fails (e.g., due to data node unavailability, network problems, corrupt data, data node no longer hosting the block), the client may subsequently contact another data node hosting the data block.

When the client A 220 writes a first data block to the object 1, the client may first request the name node 220 to select the one or more data nodes 210a-210c to host replicas for the data block being written. The client 220 organizes a pipeline from data node to data node and sends the data. For example, the client sends the first block to a first data node which then sends the data to the second data node in the pipeline, which then sends the data to the third data node in the pipeline, and so on, depending on the number of data nodes as determined by the replication facto. When the first block has been stored on all data nodes of the pipeline, the client may request from the name node a list of new data nodes to be selected to host replicas of the next written block. The foregoing may be repeated for each written block. HDFS provides an API that exposes the locations of data blocks. HDFS allows an application to also set the replication factor for a particular file that may vary with criticality of the object (e.g., For critical objects or objects which are accessed very often, having a higher replication factor improves tolerance against faults and increases read bandwidth).

As noted above, data may be added by a client by creating a new object and writing data to the object, or otherwise appending data to an existing object. With HDFS, after the object is closed, the data written cannot be altered or removed except that new data can be added to the object by reopening the object for append. HDFS implements a single-writer, multiple-reader model. The HDFS client that opens a file for writing is granted exclusive write access to the object so that no other client is able to write to the object for a defined time period known as a lease may be renewed by a client by contacting the name node. After the defined time period, without renewal of the lease, the client accessing the object for writing may be pre-empted by another client. An object accessed for write does not prevent other clients from reading the object—the object may have many concurrent readers.

As described elsewhere herein, an HDFS entity such as an object or file may be partitioned into portions referred to as blocks. When there is a need for a new block, such as by a client contacting the name node as part of performing a write, the name node allocates a block with a unique block identifier (ID) and determines a list of data nodes to host replicas of the block. The data nodes form a pipeline, the order of which minimizes the total network distance from the client to the last data node. Bytes are pushed to the pipeline as a sequence of packets. The bytes that an application writes first buffer at the client side. After a packet buffer is filled (typically 64 KB), the data are pushed to the pipeline. The next packet can be pushed to the pipeline before receiving the acknowledgment for the previous packets.

The name node performs processing for block replication management such as to ensure that each block has the intended number of replicas. If name node detects that a block has become over or under replicated, the name node may take responsive actions. For example, if a block is under replicated, the name node may selects a data node to host the added block replica. If a block is over replicated, the name node may select a data node hosting a particular block replica to be removed. HDFS provides a configurable block placement policy used by the name node in connection with selecting one or more data nodes at which to host a newly written data block and also may be used to determine where to store an additional block replica. For example, a default policy or other policy may be used that minimizes write cost and balances data reliability, availability and available read bandwidth. For example, various criteria may be considered when selecting the data nodes to host block replicas. Such criteria may include, for example, current amounts of storage utilized or consumed by the particular data nodes (e.g., thus denoting an amount of workload regarding data access for particular blocks at each node), whether two data nodes are on the same server rack (e.g., denoting an increased risk of both data nodes failing at the same time such as due to a power failure or other items common to the same server rack), and the like. Additionally data nodes may communicate with one another, for example, to rebalance data, move copies around (e.g., such as instructed by the name node), and the like.

Thus, HDFS stores large objects across multiple data nodes and achieves reliability by replicating the data across multiple data nodes or servers. HDFS is designed with a fundamental assumption that hardware failures (e.g., such as failure of the local disk drives of the data node servers or other general failure of the data node servers) are commonplace and thus should be automatically handled in software by the framework. Each file server used as a data node may not be fault tolerant and not have high availability. As noted above, each individual data server functioning as a data node may not utilize data protection such as RAID so that, for example, if the hosted block replica stored on a local storage device of a data node is corrupted, the data node is not able to service requests to read the block.

Furthermore, use of HDFS does not provide for efficient use of the underlying physical storage providing the multiple replicas for each data block. Generally, each data node independently controls and maintains its own block replicas so that physical storage is provisioned for each such block replica. With reference back to FIG. 4 with a replication factor of 2 as noted above, the HDFS file system provides for storing 2 physical replicas or copies of each data block. For example with reference to the 4 blocks of file 1, collectively 8 blocks of storage are provisioned and allocated on local attached storage devices X, Y and Z 212a-c used, respectively, by data nodes 210a-c for storing hosted block replicas. If the replication factor were higher, such as using a default value of 3 or even greater for critical data, the total amount of physical storage consumed is further multiplied. Generally where N is the replication factor denoting the number of replicas of each data block, N*the number of blocks characterizes the total amount of physical storage used for the data with additional storage on the various nodes as may be needed for metadata).

With HDFS, the replication factor determines the number available data nodes. Thus, using HDFS and reducing the replication factor or number of replicas stored for each data block also reduces the number of data nodes available to service requests for each data block. For example, if HDFS is configured to have a replication factor of 1 per data block, only a single data node serves data requests for each data block.

It should be noted that the foregoing is described with reference to files and a file-based interface and also objects and an object-based system. However, HDFS used in an embodiment in accordance with techniques herein may be used in connection with a filed-based system as well as other suitable types of data stores. For example, HDFS or more generally a DFS in accordance with techniques herein may be used with a distributed object-based data store where objects are used rather than files, where the metadata server is an object-based metadata server rather than a file meta data server, where the blocks of refer to portions or chunks of each object rather than each file, and the like. In an object-based system using HDFS where each of the data entities are objects rather than files, the HDFS data node software 211a-c may include functionality that maps the object based representation to the native file system/file-based representation of the data node which is in turn mapped to a native block-based representation.

What will now be described are embodiments in accordance with techniques herein which embed or incorporate functionality of the HDFS components using a block-based system and data store into the data storage system along with some additional components to facilitate the embedded HDFS components operating within the data storage system.

One embodiment in accordance with techniques herein using the HDFS as the particular DFS may incorporate data nodes into a data storage system, such as a data storage array or appliance. For example, at least one embodiment may incorporate the data nodes of the HDFS into a single data storage array as EMC's Symmetrix® VMAX® data storage system. In the following examples, assume that the HDFS is configured to have a replication factor of 3 whereby 3 data nodes each may be used in servicing requests for the same data block. However, as described below, in an embodiment in accordance with techniques herein, the 3 data nodes may all access a same physical copy or instance of the data blocks rather than each such data node having its own replicate copy of each data block. Additionally, assume that the HDFS implementation includes functionality for object-based storage and an API is provided to clients which is an object-based API to perform operations, such as read, write, delete, create, and operations regarding access permissions for users (e.g., modify access, provide read or write access to particular users) and the like, with respect to data entities that are objects. The API may also include directory-based operations related to directories of objects in an object hierarchy in a manner similar to directories of files (e.g., operations may include creating a directory, deleting a directory, modifying or specifying access of a directory to particular users, and the like).

Figure 5:
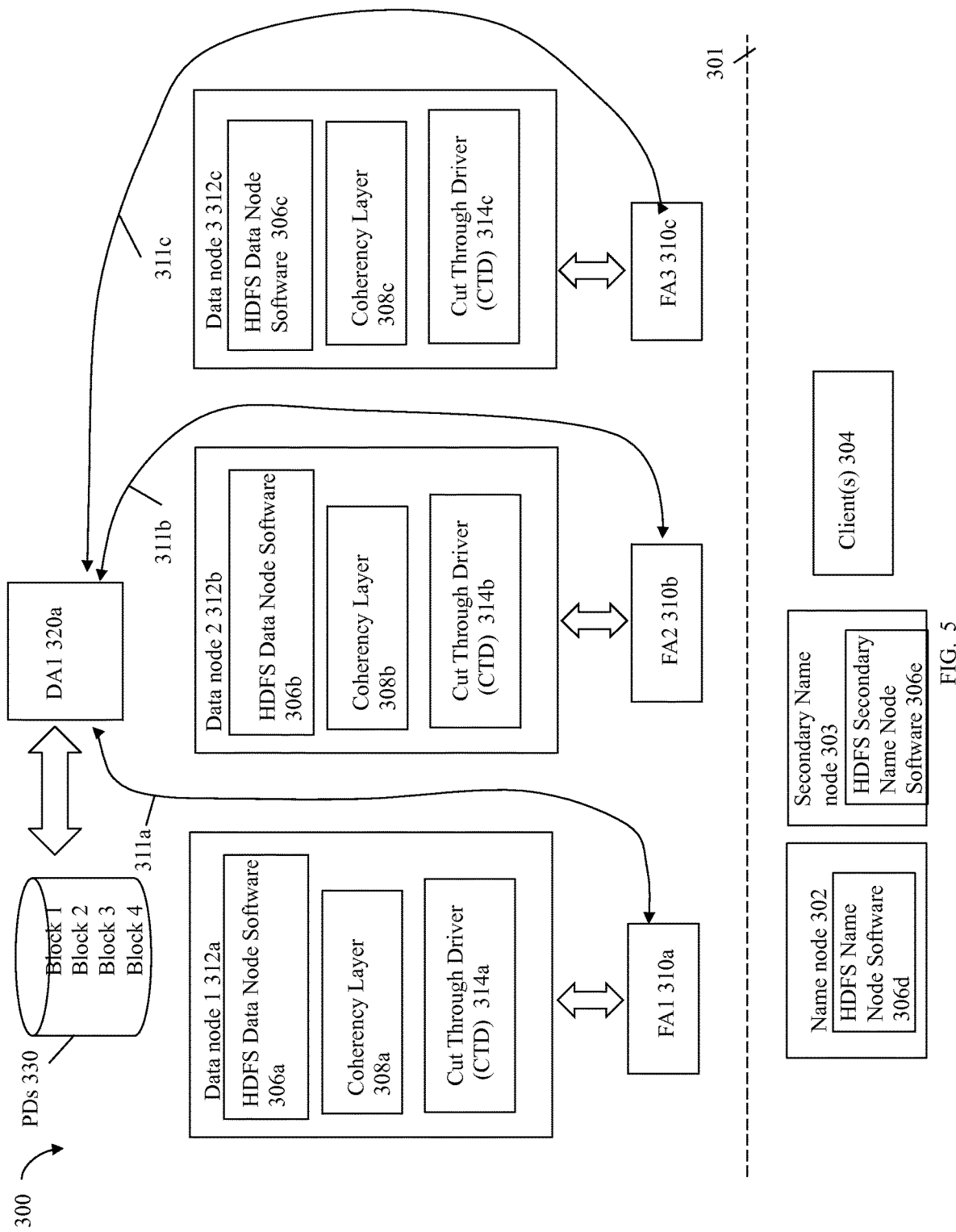
FIGS. 5, 6, and 7 are examples of components that may be included in embodiments in accordance with techniques herein.

With reference to FIG. 5, shown is an example representation of components that may be included in an embodiment in accordance with techniques herein. The example 300 includes components above the line 301 which may be included in the data storage system and components below the line 301 which may be external to the data storage system. It should be noted that additional details of components that may be included in the data storage system, as well as communication connections, and the like, have been omitted for simplicity. However, an embodiment of the data storage system may include other components and perform processing consistent with description elsewhere herein.

Components of the data storage system may include one or more PDs 330 providing back-end non-volatile storage such as for storing data blocks of the HDFS, one or more back end DAs such as DA 1 320a, one or more front end adapters (e.g., HAs such as Fibre channel adapters) such as FAs 310a-c, and executing instances of software for multiple data nodes, such as data nodes 312a-c.

Data node 312a may be exposed through an external port of FA1 310a and may receive external communications, such as from any of clients 304, name node 302 or secondary name node 303. Data node 312b may be exposed through an external port of FA2 310b and may receive external communications, such as from any of clients 304, name node 302 or secondary name node 303. Data node 312c may be exposed through an external port of FA3 310c and may receive external communications, such as from any of clients 304, name node 302 or secondary name node 303.

Elements 311a-c generally respectively represent that each of the data nodes 312a-c may communicate with the DA1 320a such as to read data from and write data to back-end PDs 330. Element 311a denotes that data node 312a may be configured to communicate with DA1 320a using FA1 310a. Element 311b denotes that data node 312b may be configured to communicate with DA1 320a using FA2 310b. Element 311c denotes that data node 312c may be configured to communicate with DA1 320a using FA3 310c. As described elsewhere herein, each of the data nodes 312a-c may communicate respectively with other components (of which DA 320a is one) of the data storage system using ports of FAs 310a-c.

The PDs 330 may be configured, for example, into one or more RAID groups providing physical storage for storing data blocks of HDFS. In this example, blocks 1-4 may denote the data blocks stored on PDs 330 of a RAID group. As illustrated and described elsewhere herein in more detail, each of the data nodes 312a-c may be configured using HDFS to service requests for the blocks 1-4 whereby such data blocks are accessible to the clients over multiple data nodes and whereby each of the data nodes 312a-c access a single copy of each of the blocks 1-4.

Components external to the data storage system may include the name node 302, secondary name node 303 and one or more clients 304 all of which may communicate with the data storage system 301 such as by issuing requests to front end ports of the data storage system, such as front end ports of FAs 310a-310c.

The name node 302 including HDFS name node software 306d, secondary name node 303 including HDFS secondary name node software 306e, and HDFS data node software 306a-c may generally perform processing similar to that as described elsewhere herein in connection with the HDFS (e.g., as in connection with FIGS. 3 and 4). Additionally, an embodiment in accordance with techniques herein may include other software performing additional processing. The data node 312a may also include coherency layer 308a and a cut through driver (CTD) 314a. The data node 312b may also include coherency layer 308b and a CTD 314b. The data node 312c may also include coherency layer 308c and a CTD 314c. The coherency layer instances 308a-c and CTD 314a-c are described in more detail below.

In at least one embodiment of a data storage system that is an EMC Symmetrix® VMAX® data storage system, the data storage system may include multiple physical boards of components of the data storage system. For example, each board may include one or more front end components (e.g., HAs such as FAs, one or more DAs and a portion of global system memory). Components on the boards may communicate using a high speed communication fabric and protocol, such as InfiniBand, so that the global memory including cache located on the different boards may be shared among all directors, or more generally components on the boards.

An embodiment of the data storage system may include functionality that provides for running virtual machines (VMs) as guests on the data storage system using resources of the data storage system. In this embodiment, code of each of the data nodes 312a-c may execute in a virtualized environment, such as a VM, on one of the processors of boards of the data storage system. In one embodiment each data node 312a-c may be on a separate board such as for purposes of load balancing. The data storage system may include a data resource manager that handles distribution and allocation of data storage system resources for use by the virtual machines and virtualized environment. In one embodiment, a portion or subset of data storage system resources may be partitioned for use by the virtualized environment where such subset of resources to be used by the virtualized environment may be managed and allocated among the virtual machines by the data resource manager. For example, in one embodiment in which each data node 312a-c is executed in the context of a virtual machine in a virtualized environment, the data resource manager may handles distribution and allocation of data storage resources used by the virtualized environment among the various virtual machines such as, for example, which processor(s) are used for executing the virtual machines, what global memory or cache may be used by the VMs, what ports of what components (e.g., DAs, FAs, etc.) are used by the VMs, what physical storage is used by the VMs for their configured logical devices, and the like.

Thus, the embodiment of FIG. 5 provides for presenting a single copy of each data block accessible to clients through multiple FA ports or paths each associated with a different data node 312a-c. In such an embodiment in accordance with techniques herein, multiple data nodes 312a-c may be characterized as owning the same block with each data node accessing the same physical copy on PDs 330 within the data storage system. Same PDs 330 are accessed by the data nodes 312a-c and the PDs 330 may store a single instance of each block rather than 3 replicate copies. It should be noted that the single instance on the PDs 330 represents the single RAID protected copy that may be stored in accordance with the particular RAID configuration of the PDs 330. Thus, backend physical storage PDs 330 as well as the data blocks 1-4 stored thereon are shared by the embedded data nodes of the data storage system.

It should be noted that an embodiment may increase the number of data nodes that may be needed to serve clients without increasing the storage capacity for the data blocks. For example, assume that 2 more data nodes are needed to service requests for the data blocks whereby each data block is accessible through 5 data nodes (e.g., the 5 data nodes handle requests for blocks 1-4 stored on PDs 330. Adding the 2 more data nodes means the same copy of the data blocks 1-4 on PDs 330 are available through the additional 2 data nodes without further storing additional block replicas (e.g., no additional storage capacity needed with data blocks 1-4 when 2 more data nodes are added).

In one embodiment as described herein each of the data nodes 312a-c are virtualized and execute in the context of virtual machines in a virtualized environment and further communicate with a virtualized FA port. For example, the block I/O from the virtualized data node 312a may be sent to the virtualized local FA port of FA 310a using CTD 314a which performs a memory to memory copy. The block I/O operation for a write, for example, copies data from memory used by the CTD 314a to memory used by the virtualized local FA port.

Generally each of the coherency layers 308a-c may perform processing to facilitate coordinating and sharing of the single copy of each data block among the various data nodes configured to access the particular data blocks. For example, in this case each of the data nodes 312a-c may be configured to own and access the data blocks 1-4. Thus, the data blocks 1-4 may be characterized as a single copy of data shared among and between the data nodes 312a-c. The coherency layers 308a-c may perform processing to facilitate coordination and sharing of the data blocks 1-4 by the data nodes 312a-c such as in connection with performing read and/or write requests. Such processing to facilitate sharing the single copy may include, for example, coordinating access to the shared data blocks (e.g., notify data nodes when a new data block is added to an object, notifying data nodes when data blocks have been deleted from an object, performing locking when a modification to an object is performed, and the like). In one embodiment, each of the coherency layers 308a-c may be a distributed file system such as a distributed NFS file system. For example, each of 308a-c may be an instance of pNFS or Parallel NFS.

As known in the art, NFS V 4.1 provides protocol support to take advantage of clustered server deployments including an extension that may be referred to as pNFS (parallel NFS) extension) to provide scalable parallel access to files distributed among multiple servers. The pNFS functionality may be included in such a protocol supported in an embodiment in accordance with techniques herein. With pNFS in connection with client requests, the client may request the metadata such as regarding multiple data blocks and then subsequently the client may directly issue in parallel multiple requests to the different servers included in the distributed file or object system.

The coherency layers 308a-c may perform processing that includes mapping a block of an object in the HDFS to its corresponding location on physical storage, such as on PDs 330. The foregoing may be performed using metadata regarding the HDFS data blocks where the metadata may be, for example, stored and accessed by the data nodes 312a-c. For example, each data node 312a-c may have its own copy of metadata for those HDFS data blocks its owns or exposes to clients.

In an object-based system using HDFS where each of the data entities are objects as in this example rather than files, each of the coherency layers 308a-c may include functionality that maps the object based representation of the HDFS block to its native file system/file-based representation on the data node/data storage system and then to its corresponding native block I/O representation as on the data node/data storage system.

In one embodiment, each of the virtualized data nodes 312a-c may communicate with a virtualized FA port of an FA. For example, data node 312a may communicate using its CTD 314a to a virtualized FA port of FA1 310a, data node 312b may communicate using its CTD 314b to a virtualized FA port of FA2 310b, and data node 312c may communicate using its CTD 314c to a virtualized FA port of FA2 310c. The foregoing virtualized FA ports may be used, for example, when communicating with the DA1 320 for reading data from and write data to the PDs 330 when servicing client requests, and for also forwarding received client requests to the various data nodes 312a-c. For example, a read request may be received at FA1 310a from a client 304 which is forwarded to data node 312a for processing (e.g., through layers 314a, 308a and then to 306a for processing). The HDFS data node software 306a may perform processing to then forward the read request through 308a, 314a, 310a (over the virtualized FA port), and then to DA1 320a to retrieve the requested data which is then forwarded back to the data node 312a. The data node 312a may then return the requested read data to the requesting client 304 through another port of the FA1 310a connected to the external network. A write request from a client may follow a similar I/O path where the write data is forwarded over the virtualized FA port of 310a to DA 320a for writing.

It should be noted that in connection with performing reads to read data from the PDs 330 and/or write data to the PDs 330, such data may be stored in cache not illustrated in FIG. 5 rather than have direct communication between the FAs and DAs for I/Os. For example, data which is read may be firstly stored by the DA 320a in cache where the data may then be retrieved by the data node 312a from the cache over the virtual FA port of FA 1 310a. Similarly, data which is written to PDs 330 may be firstly stored by the data node 312a in cache over the virtual FA port of FA1 310a. The write data may then be retrieved by the DA 320a from the cache and written out to the PDs 330.

It should also be noted that in an embodiment where the data nodes 312a-c execute in a virtualized environment and communicate using the CTDs 314a-c to virtualized FA ports of 310a-c, the virtualized FA ports may be more generally used by the data nodes 312a-c to communicate with other components of the data storage system as needed to perform processing with servicing requests with respect to data blocks.

In one embodiment, each of the data nodes 312a-c may run in the context of a guest operating system (OS) that runs within a VM. A container may be created which provides a virtual hardware environment for the guest OS. In particular, the container provides memory to the guest OS which is run as a thread in the OS of the data storage system and scheduled by the OS of the data storage system. Thus, the guest OS runs in the virtual environment provided by the container. The cores or processors consumed by the guest OS and thus the data nodes may be allocated to an FA. All block I/O from the guest, such as from data node 312a's coherency layer 308a, is sent to a local FA port by means of a virtual FA port (of the virtualized environment) and a corresponding pseudo-PCI device referred to herein as the CTD, such as CTD 314a. Thus, the CTD such as 314a may be used to facilitate communication between the virtualized data node and an FA, such as FA 310a. The guest OS and use of CTD is described herein and also, for example, in U.S. Pat. No. 8,930,568, Issued Jan. 6, 2015, METHOD AND APPARATUS FOR ENABLING ACCESS TO STORAGE, Chalmer et al., assigned to EMC Corporation of Hopkinton, Mass., which is incorporated by reference herein.

Thus, the foregoing embodiment provides for using data storage services and functionality of the data storage system. For example, the physical storage of the data storage system used to store blocks of objects may be provisioned from configured RAID groups providing data protection and eliminating the requirement of N physical copies of each data block. In an embodiment in accordance with techniques herein, each of the data nodes may access the same data block that may be stored on physical storage of the configured RAID group. Thus, embedding the data nodes in the data storage system provides for more efficient use of physical storage where shared physical storage capacity may be exposed or presented over multiple paths through multiple data nodes to clients 304. The data nodes may be configured to provide any desired level of replication in terms of HDFS which in this embodiment has all data nodes using the single copy of each data block.

The embodiment in accordance with techniques herein of embedding the data nodes in the data storage system eliminates the additional server system hardware used for the data nodes, reduces network traffic and may use a CTD. Network traffic may be reduced, for example, when writing client data where communication between data nodes of the pipeline is now done internal within the data storage system rather than between data nodes of the pipeline over the network.

It should be noted that clients 304 may request metadata regarding objects from the name node 302 in a manner as described elsewhere herein to determine which data nodes of the data storage system own which data blocks of the object (e.g., which data nodes expose which data blocks and can therefore service requests regarding the data blocks).

In this example for simplicity, only 3 data nodes have been included where all data blocks are exposed through all data nodes 312a-c. However, more generally, it will be appreciated by those skilled in the art that any number of data nodes may be used and data blocks of an object may be exposed through any number of data nodes in the system (e.g. may be less than all the data nodes depending on how many data nodes are needed to service requests for the data blocks). Also, as described elsewhere herein, an embodiment may vary the particular portion of data nodes through which particular objects and associated data blocks are exposed, for example, such as to load balance servicing requests among the different data nodes.

Figure 6:
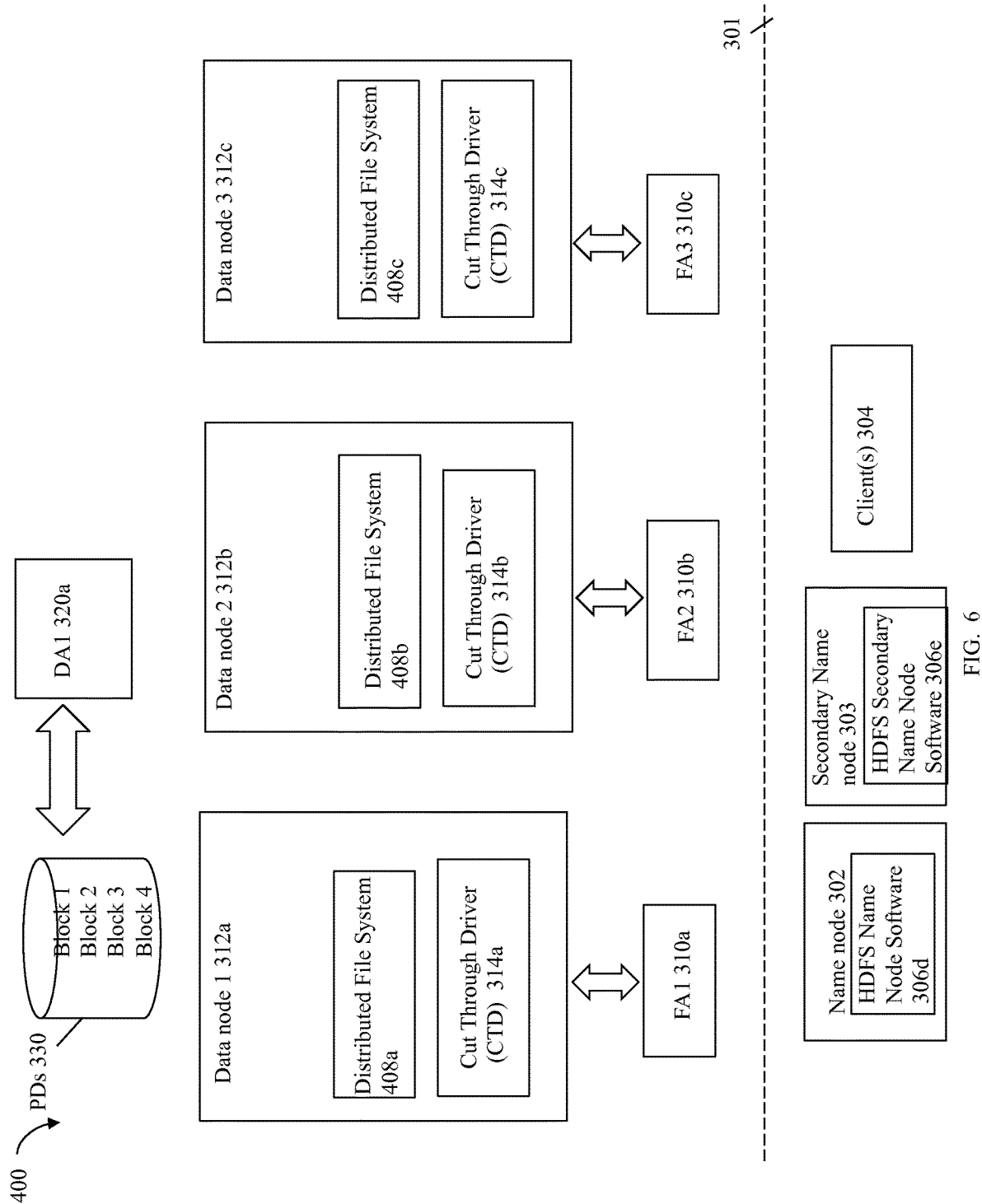

Referring to FIG. 6, shown is another embodiment in accordance with techniques herein. Described in connection with FIG. 5 is an embodiment in which the data blocks managed and stored are portions of objects in an object-based system. With an object-based system, each object may be mapped to a file-based representation which is then mapped to a block-based representation as mentioned elsewhere herein. As an alternative, an embodiment in accordance with techniques herein may be implemented using a file-based system whereby the top level object-based system is eliminated. With reference to FIG. 5, in a file-based system where the entities managed are files rather than objects, the HDFS data node software 306a-c may be eliminated from each data node and the coherency layers 308a-c of the data nodes 312a may be implemented as distributed file systems. The foregoing is illustrated with reference now to the example 400 of FIG. 6. FIG. 6 includes functionality and components similar to that as described in connection with FIG. 5 with the difference that 306a-c of FIG. 5 have been eliminated and each of the coherency layers 308a-c is a distributed file system as denoted by 408a-c. For example, the distributed file systems 408a-c may each be an instance of a distributed NFS file system such as pNFS. In this case, each of the clients 304 may communicate with the distributes file systems 408a-c using the appropriate file system protocol, such as pNFS in this example.

Figure 7:
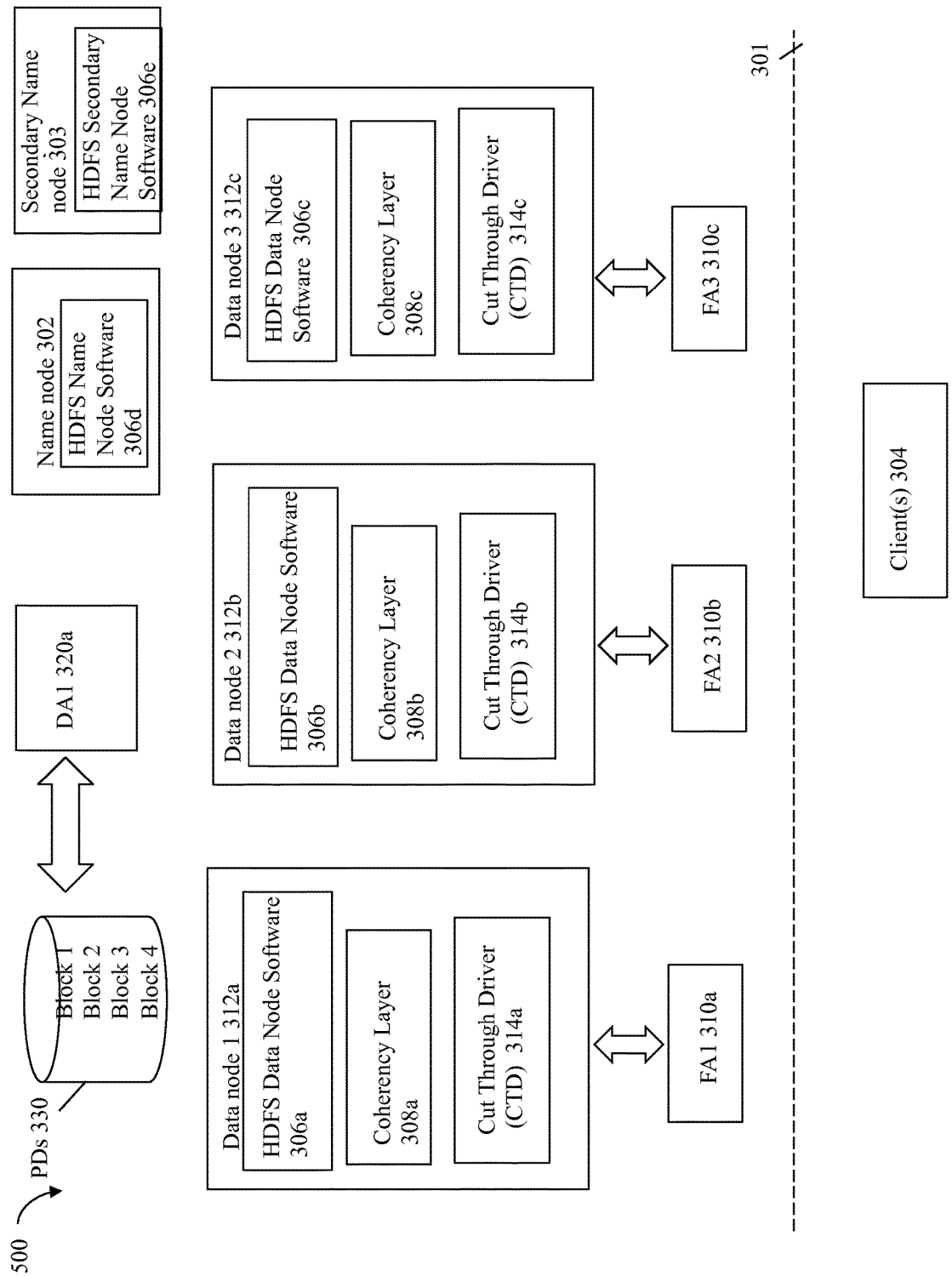

Referring to FIG. 7, shown is another example of an embodiment in accordance with techniques herein. Described in connection with FIG. 5 is an embodiment in which the data blocks managed and stored are portions of objects in an object-based system where the data nodes are embedded in the data storage system and may run in a virtualized environment. As a further variation, any one or more of the name node 302 and secondary name node 303 may be embedded in a data storage system in a manner similar to that as described herein in connection with the data nodes 312a-c such as in connection with FIG. 5. The name node 302 and secondary name node 303 may execute in a virtualized environment, such as VMs, similar that as described herein with the data nodes 312a-312c. In such an embodiment, the components of FIG. 7 may operate as described elsewhere herein (e.g., in connection with FIG. 5) with the difference that any one or more of the name node 302 and secondary node 303 execute in the data storage system.

An embodiment in accordance with techniques herein may have the coherency layer, such as denoted by elements 308a-c in the embodiments of FIGS. 5 and 7 and also denoted by elements 408a-c of FIG. 6, interface with another component of the data storage system providing a data service. A data service may include, for example, a local or remote data replication service (e.g., that makes a physical copy of an object store, portion of an object store, specific objects, one or more file systems, one or more directories, one or more files, and the like), a snapshot facility (e.g., that takes a snapshot of an object store, portion of an object store, specific objects, one or more file systems, one or more directories, one or more files, and the like), and any other data service that may be included an embodiment.

As known in the art, a snapshot may be characterized as a point in time logical image of data. In connection with files and a file system or objects, software of a data storage system may provide one or more data protection services or facilities whereby a snapshot is one such facility. Generally, a snapshot may be made with respect to a source file thereby providing a point in time image of the source file. A snapshot may appear like a normal file and may be used for backup, testing, and the like. Snapshots may rely on any one or more techniques such as may be used, for example, to track source file changes from the time when a snapshot was created thereby identifying the differences between the source or production file and its snapshot. In this manner, techniques may be used to reduce the amount of data stored. For example, the snapshot and the source file may both be initially associated with a same set of data blocks. As changes are made to the source file, additional storage may be allocated as needed to store the updated data and then associated with the source file. Thus, a same data block common to both the source file and its snapshot may be stored once and then associated with both the snapshot and the source file. As the source file is updated, the changed data may be stored in new disk space and associated only with the source file. Thus, rather than make a complete physical copy of the source file when creating a snapshot, the storage capacity required to implement snapshots may be considerably less than that of the source file. A snapshot of a file is a virtual point in time copy and requires access to the unchanged data in the source file. Therefore failures affecting the source file also affect the snapshot of the file. Snapshots of a file may be contrasted, for example, with other data services that may provide bit-for-bit replica data copies of the source data file. In a manner similar to that as described above for snapshots of a file, a snapshot may be made with respect to a file system, directory, object, set of objects, and generally any suitable data entity. An embodiment in accordance with techniques herein may use any suitable technology to create the desired snapshots.

By embedding HDFS data nodes inside the data storage system, such as executing each data node as a VM in a virtualized environment on a processor of the data storage system, only 1 copy per data block needs to be stored. Data reliability and hardware reliability of the data nodes are all addressed using functionality of the data storage system. Physical storage is used more efficiently by eliminated replicas of each data block depending on the number of data nodes as described above. By leveraging pNFS or more generally a distributed file system as the coherency layer, a global shared file system is constructed. Such techniques enable multi-pathing by exposing the same data block having a single copy of data over multiple data nodes. Changes are made so that multiple data nodes become aware that multiple data nodes are exposing, and can service requests in connection with, the same data block. The name node returns one or more data nodes exposing a data block where if there are multiple such data nodes, the list of such data nodes returned to the client for the particular data block may be based on network proximity between client and the data nodes.

It should be noted that HDFS as described herein may generally be used in connection with providing data that is written once and then read. The particular data entities, such as files or objects, may be extended or appended to by writing additional new data blocks. However, in one embodiment, HDFS may not provide operations for overwriting an existing data block. As a variation, and more generally, an embodiment in accordance with techniques herein include additional functionality which would provide for such additional operations. More generally, techniques herein are not so limited to use with a distributed file system that may only include or allow particular operations.

An embodiment in accordance with techniques herein may also process client requests of different versions of the same distributed file system or object protocol.

Figure 8:
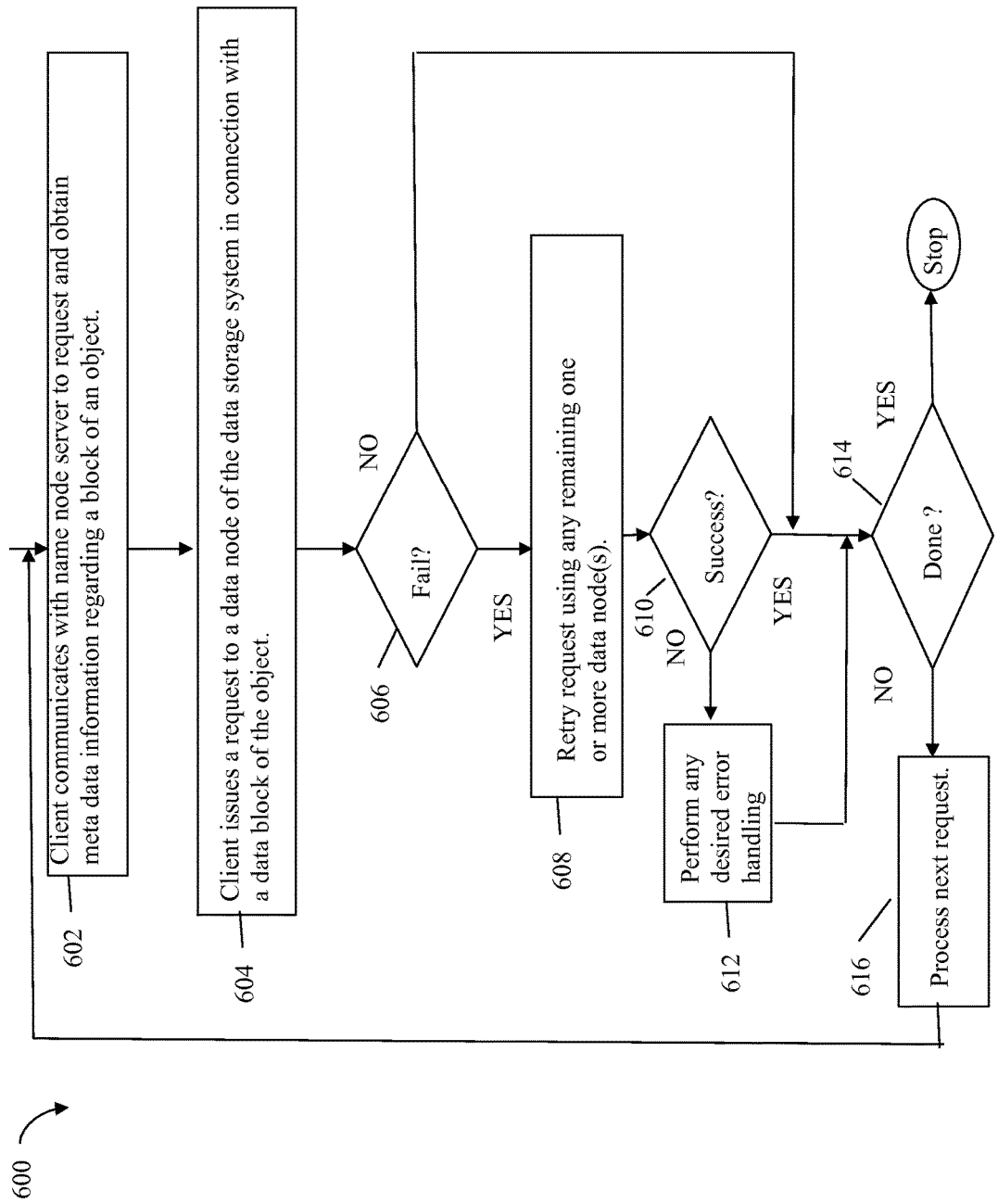
FIG. 8 is a flowchart of processing steps that may be performed in an embodiment in accordance with techniques herein.

Referring to FIG. 8, shown is a flowchart of processing steps that may be performed in an embodiment in accordance with techniques herein. The flowchart 600 summarizes processing described above. At step 602, the client communicates the name node server to request and obtain metadata information regarding a block of an object. At step 604, the client issues a request to a data node identified in the metadata information as exposing (having access to or owning) the data block. As described elsewhere herein, when there are multiple data nodes exposing or able to service requests for the same data block, the data node to which the request is issued in step 604 may be identified as the data node of the multiple data nodes that is the closest to the client in terms of network proximity.

At step 606, a determination is made as to whether the request failed to be serviced by the data node. If step 606 evaluates to no, control proceeds to step 614. If step 606 evaluates to yes, control proceeds to step 608 to retry the request using any one or more remaining data nodes as returned in the metadata information. At step 610, a determination is made as to whether a subsequent request issued to another data node as part of step 608 processing succeeded. If step 610 evaluates to no, processing proceeds to step 612 to perform any desired error handling and then control proceed to step 614. If step 610 evaluates to yes, control proceeds directly to step 614. At step 614, a determination is made as to whether the client is done processing requests. If so, processing stops. If step 614 evaluates to no, control proceeds to step 616 to process the next request by returning to step 602.

The techniques herein may be performed by executing code which is stored on any one or more different forms of computer-readable media. Computer-readable media may include different forms of volatile (e.g., RAM) and nonvolatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A data storage system comprising:
   one or more physical storage devices;
   a plurality of data nodes exposing a plurality of data portions of a plurality of data entities, wherein a first of the plurality of data portions is exposed through a set of at least two of the plurality of data nodes, wherein a single replica of the first data portion is a shared single copy of the first data portion that is stored on the one or more physical storage devices that are shared by the plurality of data nodes, and each of the plurality of data nodes accesses the shared single copy of the first data portion that is the single replica of the first data portion; and
   a memory comprising code stored thereon that, when executed, performs a method comprising:
      receiving a request from a client at a first of the set of at least two data nodes to perform an operation with respect to the first data portion, wherein the shared single copy of the first data portion is exposed to the client over a plurality of paths from the set of at least two data nodes, wherein each of the plurality of paths is between the client and a different data node of the set and said each path exposes the shared single copy of the first data portion to the client from the different data node of the set, and wherein the at least two data nodes of the set, each exposing the shared single copy of the first data portion to the client over a different one of the plurality of paths between the client and the data storage system, access the shared single copy of the first data portion stored as the single replica on the one or more physical storage devices shared by the plurality of data nodes, wherein the plurality of data nodes are included in a distributed file system configured with a replication factor that indicates a number of data nodes available to service client requests for data, wherein the set includes the number of data nodes indicated by the replication factor, and wherein increasing the replication factor by one adds another data node over which the shared single copy of the first data portion, stored as the single replica on the one or more physical storage devices shared by the plurality of data nodes, is exposed to the client without adding another replica of the first data portion, wherein each of the at least two data nodes of the set include a coherency layer that performs processing to facilitate coordinating and sharing of the single replica that is the shared single copy of the first data portion among the at least two data nodes of the set configured to own and access the first data portion; and
      processing the request with respect to the first data portion using the single replica that is the shared single copy of the first data portion accessible to each of data nodes of the set.

2. The data storage system of claim 1, wherein the one or more physical storage devices include a plurality of physical storage devices configured in a RAID group providing data protection for the plurality of data portions stored therein.

3. The data storage system of claim 1, wherein the method further comprises:
   issuing a request from the client to a name node requesting metadata regarding the first data portion; and
   receiving from the name node at the client the requested metadata including first information identifying the set of at least two data nodes.

4. The data storage system of claim 3, where the first information lists the data nodes of the set in order of network proximity with respect to the client.

5. The data storage system of claim 4, wherein the first data node is identified as a closest of all data nodes in the set to the client in terms of network proximity to the client.

6. The data storage system of claim 1, wherein the data entities are objects included in an object-based system.

7. The data storage system of claim 1, wherein the data entities are files included in a file system.

8. The data storage system of claim 1, wherein the plurality of data nodes are embedded in the data storage system and execute in a virtualized environment in the context of virtual machines on processors of the data storage system.

9. The data storage system of claim 8, wherein each of the plurality of data nodes includes the coherency layer that performs processing to synchronize and coordinate access to the plurality of data portions between the plurality of data nodes.

10. The data storage system of claim 9, wherein the coherency layer is a distributed file system.

11. The data storage system of claim 10, wherein the coherency layer is a parallel distributed file system.

12. The data storage system of claim 3, wherein the name node server is embedded in the data storage system and executes in a virtualized environment in the context of a virtual machine on a processor of the data storage system.

13. The data storage system of claim 8, wherein each of the plurality of data nodes communicates with a virtualized port on the data storage system using a cut through driver.

14. The data storage system of claim 13, wherein the cut through driver performs memory to memory copying of data between the data node and the virtualized port.

15. A method for processing requests comprising:
receiving, at a data storage system from a client, a request to perform an operation with respect to a first of a plurality of data portions stored on one or more physical storage devices of the data storage system, the plurality of data nodes being included in the data storage system and exposing the plurality of data portions of a plurality of data entities, the first data portion being exposed through a set of at least two of the plurality of data nodes, wherein a single replica of the first data portion is a shared single copy of the first data portion that is stored on the one or more physical storage devices that are shared by the plurality of data nodes, and each of the plurality of data nodes accesses the shared single copy of the first data portion that is the single replica of the first data portion, said request being received at a first of the data nodes of the set; and
processing the request with respect to the first data portion using the single replica that is the shared single copy of the first data portion accessible to each of the data nodes of the set, wherein the shared single copy of the first data portion is exposed to the client over a plurality of paths from the set of at least two data nodes, wherein each of the plurality of paths is between the client and a different data node of the set and said each path exposes the shared single copy of the first data portion to the client from the different data node of the set, and wherein the at least two data nodes of the set, each exposing the shared single copy of the first data portion to the client over a different one of the plurality of paths between the client and the data storage system, access the shared single copy of the first data portion stored as the single replica on the one or more physical storage devices shared by the plurality of data nodes, wherein the plurality of data nodes are included in a distributed file system configured with a replication factor that indicates a number of data nodes available to service client requests for data, wherein the set includes the number of data nodes indicated by the replication factor, and wherein increasing the replication factor by one adds another data node over which the shared single copy of the first data portion, stored as the single replica on the one or more physical storage devices shared by the plurality of data nodes, is exposed to the client without adding another replica of the first data portion, wherein each of the at least two data nodes of the set include a coherency layer that performs processing to facilitate coordinating and sharing of the single replica that is the shared single copy of the first data portion among the at least two data nodes of the set configured to own and access the first data portion.

16. The method of claim 15, wherein the one or more physical storage devices include a plurality of physical storage devices configured in a RAID group providing data protection for the plurality of data portions stored therein.

17. The method of claim 15, further comprising:
issuing a request from the client to a name node requesting metadata regarding the first data portion; and
receiving from the name node at the client the requested metadata including first information identifying the set of at least two data nodes.

18. The method of claim 17, where the first information lists the data nodes of the set in order of network proximity with respect to the client.

19. The method of claim 18, wherein the data entities are objects included in an object-based system and the plurality of data nodes are embedded in the data storage system and execute in a virtualized environment in the context of virtual machines on processors of the data storage system.

20. A non-transitory computer readable medium comprising code stored thereon, that when executed, performs a method for processing requests comprising:
receiving, at a data storage system from a client, a request to perform an operation with respect to a first of a plurality of data portions stored on one or more physical storage devices of the data storage system, the plurality of data nodes being included in the data storage system and exposing the plurality of data portions of a plurality of data entities, the first data portion being exposed through a set of at least two of the plurality of data nodes, wherein a single replica of the first data portion is a shared single copy of the first data portion that is stored on the one or more physical storage devices that are shared by the plurality of data nodes, and each of the plurality of data nodes accesses the shared single copy of the first data portion that is the single replica of the first data portion, said request being received at a first of the data nodes of the set; and
processing the request with respect to the first data portion using the single replica that is the shared single copy of the first data portion accessible to each of the data nodes of the set, wherein the shared single copy of the first data portion is exposed to the client over a plurality of paths from the set of at least two data nodes, wherein each of the plurality of paths is between the client and a different data node of the set and said each path exposes the shared single copy of the first data portion to the client from the different data node of the set, and wherein the at least two data nodes of the set, each exposing the shared single copy of the first data portion to the client over a different one of the plurality of paths between the client and the data storage system, access the shared single copy of the first data portion stored as the single replica on the one or more physical storage devices shared by the plurality of data nodes, wherein the plurality of data nodes are included in a distributed file system configured with a replication factor that indicates a number of data nodes available to service client requests for data, wherein the set includes the number of data nodes indicated by the replication factor, and wherein increasing the replication factor by one adds another data node over which the shared single copy of the first data portion, stored as the single replica on the one or more physical storage devices shared by the plurality of data nodes, is exposed to the client without adding another replica of the first data portion, wherein each of the at least two data nodes of the set include a coherency layer that performs processing to facilitate coordinating and sharing of the single replica that is the shared single copy of the first data portion among the at least two data nodes of the set configured to own and access the first data portion.

* * * * *